United States Patent
Apa et al.

(10) Patent No.: US 6,545,630 B1
(45) Date of Patent: Apr. 8, 2003

(54) EFFICIENT BEAM STEERING FOR CLOSED LOOP POLARIZATION AGILE TRANSMITTER

(75) Inventors: Martin J. Apa, Wayne, NJ (US); Joseph Cikalo, Nutley, NJ (US); William L. High, New York, NY (US); Mitchell J. Sparrow, Wayne, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 10/052,522

(22) Filed: Jan. 23, 2002

(51) Int. Cl.⁷ .................................................. G01S 7/38
(52) U.S. Cl. .................................... 342/14; 342/188
(58) Field of Search ............................ 342/13, 14, 175, 342/188, 200, 201, 202, 204

(56) References Cited

U.S. PATENT DOCUMENTS

| | | | |
|---|---|---|---|
| 4,197,541 A | * 4/1980 | Nemit et al. | 342/361 |
| H000205 H | * 2/1987 | Green et al. | 342/159 |
| 4,661,819 A | * 4/1987 | Lewis | 342/201 |
| 4,772,893 A | 9/1988 | Iwasaki | 343/779 |
| 4,937,582 A | 6/1990 | Mohuchy | 342/188 |
| 5,344,099 A | * 9/1994 | Pittman et al. | 244/3.13 |
| 5,504,493 A | 4/1996 | Hirshfield | 342/372 |
| 5,661,489 A | 8/1997 | Baker | 342/373 |
| 5,771,016 A | 6/1998 | Mullins et al. | 342/372 |
| 6,175,326 B1 | 1/2001 | Kare | 342/25 |

* cited by examiner

Primary Examiner—John B. Sotomayor
(74) Attorney, Agent, or Firm—Hunton & Williams

(57) ABSTRACT

A solid state active aperture high power polarization agile transmitter, either single or dual polarization, employing nonreciprocal antenna elements, designed such that it can be used in an Electronic Warfare system that is more efficient and less expensive. Antenna beam steering is accomplished with variable phase shifters that are used to set the RF signal phase of each element. The beam steering function is implemented with a hardware architecture where the phase shifters are built-in ahead of the power amplifiers such that these low power phase shifters impart phase delays to low power signals without wasting RF signal power and hence improving efficiency. These power transmitter devices are also more reliable, lighter in weight and smaller in size.

26 Claims, 2 Drawing Sheets

EFFICIENT BEAM STEERING FOR CLOSED LOOP POLARIZATION AGILE TRANSMITTER

FIELD OF THE INVENTION

The present invention relates generally to radar and Electronic Warfare (EW) systems, in particular to high power transmitters used in these systems.

RELATED APPLICATIONS

This application is related by subject matter to the application Ser. No. 10/097,408 entitled "Array Antenna Beam Steering Architecture", filed in the name of inventors Martin J. Apa, Joseph Cikalo, William L. High and Mitchell J. Sparrow.

BACKGROUND OF THE INVENTION

Electronic Warfare (EW) generally relates to military action involving the use of electromagnetic and directed energy to control the electromagnetic spectrum or to attack the enemy. The three major subdivisions within EW are Electronic Attack, Electronic Protection, and Electronic Support. Electronic Attack (EA) is the division of EW involving the use of electromagnetic or directed energy to attack personnel, facilities or equipment with the intent of degrading, neutralizing or destroying enemy combat capability. There is a great need for transmitters used in an EW system to be small in size, low in weight, and able to carry many watts/cubic inch. In addition, there is often a need in EW systems for a higher power transmitter that is also polarization agile.

One objective of an EW system may be to produce a jamming signal (e.g. false targets) in a threat radar receiver that is much greater in amplitude than that of the radar signal reflected by the target aircraft, with the appropriate polarization. The availability of advanced power amplification technologies makes it possible to develop high power transmitters with the above characteristics.

The basic architecture of such a transmitter is an active aperture antenna consisting of a large number of elements. Though the output power of each antenna element is a relatively low level, a high power Radio Frequency (RF) signal is obtained by combining the individual signals in space. To attain the highest power levels, a phase focusing technique is employed. Each element is tuned to produce a signal with the appropriate phase in order to spatially combine. However, phase focusing also produces a narrow beam antenna. Consequently, a beam steering network is used in order to radiate the maximum transmitted signal in a desired direction. Generally, a beam steering network may comprise a network having variable phase shifters, time delay elements or fiber optic delays with an external processor and drivers to adjust them.

Conventionally, the phase shifters are inserted at the output terminal of the system's power amplifiers, just prior to feeding the RF radiators. A significant drawback of this architecture is that a large amount of RF power is dissipated in the phase shifters placed after the power amplifiers. This reduces the efficiency of the system and requires additional cooling system capability. Moreover, dissipation of a large amount of RF power in such an architecture generally requires use of large, less reliable high power phase shifters that must be capable of handling high RF power levels. The requirement for large size phase shifters makes such transmitter systems used in EW equipment more bulky, less accurate, and less agile. These are significant drawbacks.

Also, when such a transmitter is installed on an mobile vehicle, such as an aircraft, it is necessary that as the mobile vehicle changes direction, the phase shift entered by the beam steering network is also changed. To effectively focus the narrow beam in the direction of the threat radar, it is important to monitor the direction of the incoming signal from the threat radar and adjust the phase shift effected by the beam steering phase shifters. In open loop systems, typically no adjustment is provided regarding the difference between the direction of the incoming signal and the direction of the transmitted signal. This can undermine the effectiveness of the radar jamming capability.

Other problems and drawbacks also exist.

SUMMARY OF THE INVENTION

An embodiment of the present invention comprises a polarization agile transmitter module with a closed loop architecture. The polarization agile transmitter module includes a beam steering phase shifter module, a power amplifier module, an antenna module, a transmit polarimeter, a receive polarimeter, a null adaptive tracker, and a direction finding phase shifter module, where the beam steering phase shifter module is located before the power amplifier module.

According to another aspect of the invention, an electronic counter-measure (ECM) signal is inputted into the beam steering phase shifters.

According to another aspect of the invention, the direction finding (DF) phase shifter module measures the difference in the direction of the signal received by the antenna module and the direction of the signal transmitted by the antenna module.

According to yet another aspect of the invention, the phase shift entered by the beam steering phase shifter module is changed based upon the difference in the direction of the signal received by the antenna module and the direction of the signal transmitted by the antenna module, as measured by the DF phase shifter module.

According to another aspect of the invention, the receive polarimeter measures the polarization parameters of the signal received by the antenna module.

According to yet another aspect of the invention, the transmit polarimeter adjusts the polarization of the signal transmitted by the antenna module based on the feedback received from the receive polarimeter regarding the polarization of the signal received by the antenna module.

According to another aspect of the present invention, multiple polarization agile transmitter modules are used with an array of antenna modules.

According to another aspect of the present invention, a summing network is provided with multiple polarization agile transmitter modules for summing the signal received by each of the multiple modules.

According to another aspect of the present invention, a direction finding (DF) receiver is provided for monitoring and processing of the directional information regarding the received signal.

According to yet another aspect of the present invention, a beam scanning module is provided to display the output signal from the DF receiver.

Accordingly, it is one object of the present invention to overcome one or more of the aforementioned and other limitations of existing polarization agile transmitter systems.

It is another object of the present invention to provide an efficient polarization agile transmitter using low power phase shifters.

It is yet another object of the present invention to provide a polarization agile transmitter that solves or mitigates the problems associated with the requirement of high power beam steering phase shifters.

It is another object of the present invention to provide a polarization agile transmitter that is smaller, lighter and more reliable.

It is yet another object of the present invention to provide a polarization agile transmitter capable of adjusting the direction of the transmitted signal based on the direction of the incoming signal.

It is yet another object of the present invention to provide a polarization agile transmitter capable of adjusting the polarization of the transmitted signal based on the polarization of the incoming signal.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the systems and methods, particularly pointed out in the written description and claims hereof as well as the appended drawings.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

To facilitate understanding, identical reference numerals have been used to denote identical elements common to the figures.

DETAILED DESCRIPTION OF THE INVENTION

Figure 1:
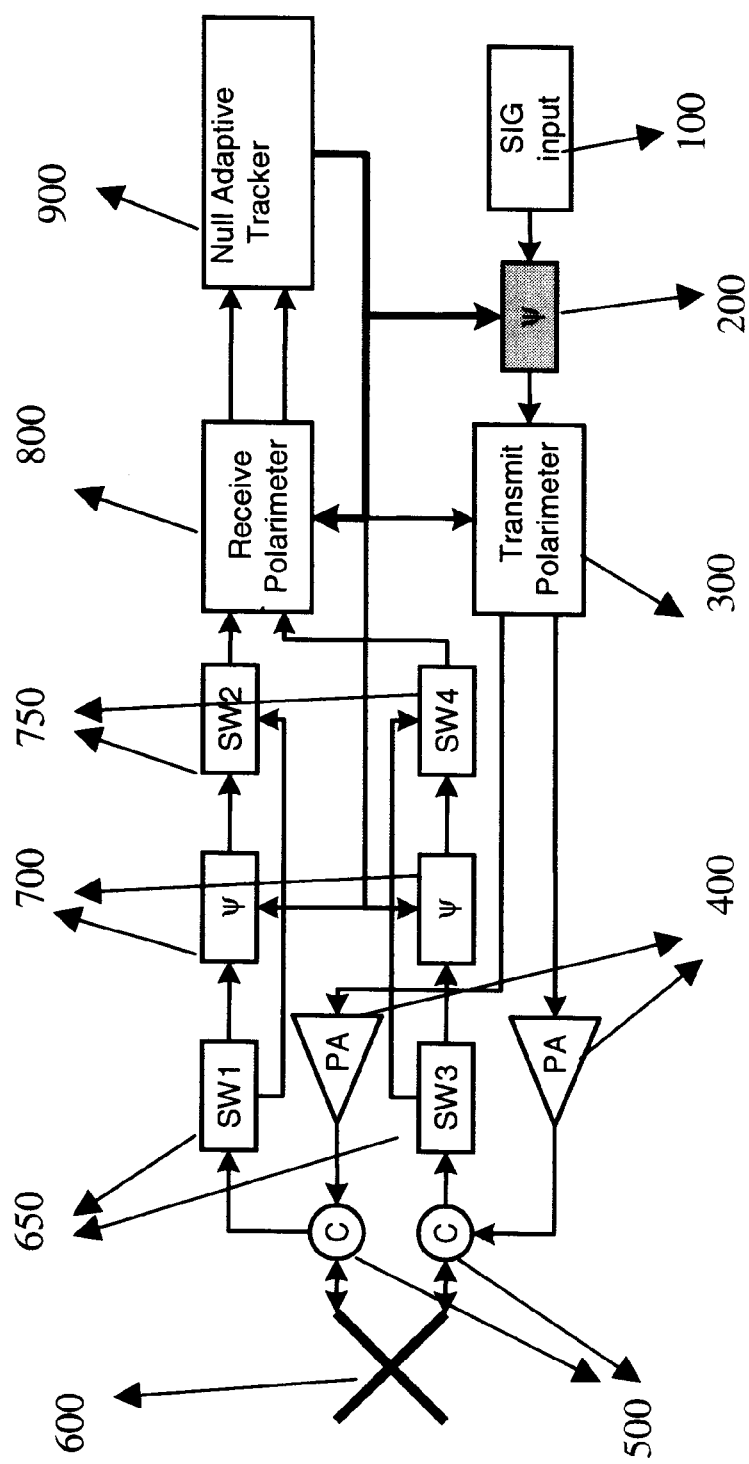
FIG. 1 is a block diagram of a polarization agile transmitter module according to an embodiment of the invention.

FIG. 1 is a block diagram of an embodiment of the present invention. According to this embodiment, ECM signal 100 is a radio frequency (RF) signal, generally obtained from the signal transmitted by the threat radar and received by a receiving antenna located on the target vehicle and possibly stored by a system external to the one described here. Such an ECM signal 100 contains information regarding the direction in which the signal should be transmitted to block the threat radar. A similar signal 610 will also be received by the antenna module 600. The antenna module 600 directs the received signal 610 to circulators 500. Circulators 500 are operatively connected to the direction finding (DF) phase shifter modules 700 via switches SW1 651 and SW3 653. Switches SW1 651, SW3 653, SW2 754 and SW4 752 straddle the DF phase shifter modules 700 such that they can either route the signal from circulators 500 around the DF phase shifter modules 700 or cause the signal from circulators 500 to pass through the DF phase shifter modules 700. The outputs from switches SW2 754 and SW4 752 are inputted into the receive polarimeter 800. The outputs from the receive polarimeter 800 are inputted into the null adaptive receiver tracker 900. The null adaptive receiver tracker 900 outputs control signals that are inputted into the beam steering phase shifter module 200, the transmit polarimeter 300, the receive polarimeter 800, and the DF phase shifter modules 700. ECM signal 100 is inputted into the beam steering phase shifter module 200. The output from the beam steering phase shifter module 200 is inputted into the transmit polarimeter 300. The outputs of the transmit polarimeter 300 are inputted into the power amplifier modules 400. The output signals from the power amplifier modules 400 are inputted into the circulators 500. The circulators 500 direct the signals to antenna module 600.

The ECM signal 100 input into the beam steering phase shifter module 200 is a radio frequency (RF) signal, generally obtained from the signal transmitted by the threat radar and received by a receiving antenna located on the target vehicle. This signal 100 is delayed by $n\psi$ degrees which causes a corresponding delay of the output signal of the n-th phase shifter in phase shifter module 200 by $n\psi$ degrees, where $n\psi$ is the phase shift effected by the n-th phase shifter. The ECM signal 100 should be fed in parallel to all of the n beam steering phase shifters in the phase shifter module 200. The beam steering phase shifter module 200 also receives a signal from the null adaptive receiver tracker 900 (the functioning of the null adaptive receiver tracker 900 is described in detail below). The phase shift $n\psi$ effectuated by each of the phase shifters in the phase shifter module 200 is controlled by the signal received from the adaptive null receiver tracker 900. As a result of the phase shifts caused by each of the phase shifters in the phase shifter module 200, the ECM signal, when inputted into the antenna module 600, generates a beam spatially focused in the desired direction. The implementation of the phase shifter module 200 to effect a beam focused in the desired direction is well known to those of ordinary skill in the art.

The beam steering phase shifter module 200 may comprise loaded line phase shifters, switched line phase shifters, hybrid-coupled phase shifters, or any other suitable device for phase shifting. Beam steering phase shifter module 200 may comprise any of the various types of phase shifters available such as transistor/diode phase shifters, FET phase shifters, GaAs Monolithic Microwave Integrated Circuit (MMIC) phase shifters, or other suitable phase shifters. In one embodiment of the present invention, low power and low cost MMIC phase shifters are used.

According to an embodiment of the present invention, the output of the beam steering phase shifter module 200 is inputted into a transmit polarimeter 300. The design and operation of an exemplary transmit polarimeter 300 is provided in U.S. Pat. No. 4,937,582 to Mohuchy, incorporated herein by reference in its entirety. The transmit polarimeter 300 also receives a signal from the null adaptive receiver tracker 900. The transmit polarimeter 300 generates orthogonal polarization components of the signal to be transmitted by antenna module 600. The transmit polarimeter 300 varies its output until the signal received from the null adaptive tracker 900 matches the signal inputted into the transmit polarimeter 300. The implementation of the transmit polarimeter 300 is well known to those of ordinary skill in the art.

The output signals from the transmit polarimeter 300 are input into the power amplifier modules 400. Each power amplifier module 400 amplifies the orthogonal polarization components before they are passed to and transmitted by the antenna module 600. The power amplifier modules 400 may be designed using a suitable technology, such as GaAs, GaN, SiC, InGaN or AlGaN MMIC chip or Microwave Power Modules (MPM) technology. In one embodiment of the invention, the power amplifier modules 400 make use of advanced power amplification technologies that use GaAs MMIC chips. Implementation of suitable power amplifiers for power amplifier modules 400 is well within the skill of the ordinary artisan.

The output signal phase of the antenna module 600 has two components, the set-on phase shifter phase ($n\psi$) and a phase error $\delta\phi_n$, a phase error of the n-th power amplifier. The composite phase value of the antenna output is not dependent on the phase shifter's location in relation to the power amplifier's location in the circuit feeding antenna module 600. Hence, placing the phase shifter module 200 before the power amplifier modules 400 should not adversely affect the phase error of the output signal phase.

The implementation of the invention as suggested here with the power amplifier modules 400 following the beam steering phase shifter module 200 results in an efficient design that provides advantages over the conventional approach of designing beam steering for a polarization agile transmitter. It has been shown that the beam steering function can be as well instrumented with the phase shifter module 200 placed before the power amplifier modules 400, as compared to the conventional approach, where the phase shifters are placed at the output of the power amplifier module. According to simulation modeling of an embodiment of the present invention, beam steering accuracy achieved by this approach is comparable to that achieved by the traditional approach. Specifically, the phase error performance in the beam steering function is maintained for the invention as compared to the conventional approach. Additionally, placing the phase shifter module 200 before the power amplifier modules 400 allows power amplifier modules 400 to compensate for any signal attenuation occurring in phase shifter module 200. In sum, the performance of the beam steering function is maintained while providing a number of significant advantages.

Continuing with FIG. 1, the amplified output signals from the power amplifier modules 400 are inputted into the circulators 500. A circulator, in its basic form, is a three port device formed by a symmetrical Y junction coupled to magnetically-biased ferrite material. A circulator permits flow of RF energy in one direction only, e.g., from port 1 to 2, 2 to 3, and 3 to 1. According to an embodiment of the invention, port 1 to 2 of circulators 500 is used to allow flow of the amplified RF signal outputs inputted from the power amplifier modules 400 to the antenna module 600; port 1 to 3 of the circulators 500 is used to allow flow of the amplified RF signal outputs from the power amplifier modules 400 to switches SW1 651 and SW3 653; and port 2 to 3 of the circulators 500 is used to allow flow of the signals received by the antenna module 600 to the switches SW1 651 and SW3 653. This or other equivalent implementations of the circulator are well within the skill of the ordinary artisan in the art.

The antenna module 600 may be comprised of specialized transducers that convert RF fields into AC signals or vice-versa. Implementation of antenna module 600 and its coupling to a circulator 500 is well within the skill of the ordinary artisan. In one embodiment of the present invention, Vivaldi Flare Notch Radiator type transducers are used in antenna module 600 to transmit and receive RF signals. The RF signals from the power amplifier modules 400 that are fed into the antenna module 600 via the circulators 500 are converted to an RF field and transmitted in the direction of the threat radar. The antenna module 600 also receives the signal from the threat radar and converts it into an electrical signal. Port 2–3 of circulator 500 enables the flow of the signal received by the antenna module 600 to switches SW1 651 and SW3 653.

In an embodiment of the invention, switches SW1 651, SW3 653, SW2 754 and SW4 752 are implemented such that the polarization agile transmitter works in two separate modes, the first being the transmit mode and the second being the receive mode. In the transmit mode, the port 1–2 of the circulators 500 directs the flow of amplified signals from the power amplifier modules 400 to antenna module 600, while port 1–3 of the circulators 500 directs the signal outputs from the power amplifiers modules 400 to the switches SW1 651 and SW3 653. During the transmit mode, switches SW1 651, SW3 653, SW2 754 and SW2 754 are operated in a self-test mode such that most of the signal received by switches SW1 651 and SW3 653 is bypassed around the DF phase shifter modules 700. Only a low level of the power amplifier module 400 output signal is passed through the DF phase shifter modules 700. DF phase shifter modules 700 measure the phase of the signal received from the corresponding power amplifier module 400 that is transmitted by the antenna module 600. As a result, in the transmit mode, most of the signal that is inputted into the switches SW1 651 and SW3 653 is bypassed to switches SW2 754 and SW2 754, and then to the receive polarimeter 800.

In the receive mode of the polarization agile transmitter, the signals generated by the antenna module 600 are directed by port 2–3 of the circulators 500 to switches SW1 651 and SW3 653. In this mode, the switches SW1 651 and SW3 653 are enabled to pass the signals to the DF phase shifter modules 700. Each of the DF phase shifter modules 700 measures the phase of the signal received by the antenna module 600. Since the amplified signal output from the power amplifier module 400 is much larger in amplitude than the signal received by the antenna module 600, only a small fraction of the signal output from power amplifier module 400 is directed to DF phase shifter modules 700.

Thus, switches SW1 651, SW3 653, SW2 754 and SW4 752 serve the function of gating the transmitted as well as the received signal around the DF phase shifter modules 700. As a result of this arrangement using the switches SW1 651, SW3 653, SW2 754 and SW4 752, it is possible to use smaller and lower power phase shifters in DF phase shifter modules 700. In an embodiment of the present invention, GaAs MMIC type phase shifters are used as DF phase shifters 700.

In DF phase shifter module 700, the phase of the signal received by the antenna module 600 is compared with the phase of the signal output by the power amplifier module 400. The information regarding the difference in phase between the two signals is used as a feedback to adjust the phase shifts effected by the beam steering phase shifter module 200. This feedback mechanism serves the important purpose of ensuring that the phase shifts entered by the beam steering phase shifter module 200 are such that the signal output from the antenna module 600 creates a beam directed towards the threat radar system. Preferably, the DF phase shifter module 700 continuously compares the phase of the signals transmitted by the antenna module 600 with the phase of the signal received by the antenna module 600. The implementation of DF phase shifter module 700 is well known to those of ordinary skill in the art.

The signals outputted from the switches SW2 754 and SW4 752 are inputted into the receive polarimeter 800. The receive polarimeter 800 resolves the signals received by the antenna module 600 into two substantially orthogonal polarized signals and measures the polarization of each component. The design and operation of an exemplary receive polarimeter 800 is provided in U.S. Pat. No. 4,937,582 to Mohuchy, incorporated herein by reference in its entirety. The polarization information about the received signal is inputted into the null adaptive receiver tracker 900.

Null adaptive receiver tracker 900 operates according to the well known principle that any polarization can be generated with two orthogonally disposed antennas whose amplitude and phase can be adjusted to the desired values. In analyzing the signal received from the receive polarimeter 800, null adaptive tracker 900 undergoes a null adaptive algorithm analysis which is well known to those of ordinary skill in the art. An example of such analysis is a null adaptive algorithm used for mono-pulse detection schemes well known in the art. Based on the two orthogonally polarized signals received from the receive polarimeter 800, the null adaptive receiver tracker 900 develops a series of control signals to set the desired polarization and phase of the signal transmitted by antenna module 600. In an embodiment of the present invention, the null adaptive receiver tracker 900 uses a digital signal processor (DSP) to analyze the orthogonally polarized signal and to develop a series of control signals. These control signals are inputted into the transmit polarimeter 300 to set the polarization of the signal to be transmitted by the antenna module 600. The control signals from the null adaptive tracker 900 are also inputted into the beam steering phase shifter module 200 to control the phase shift effected by such phase shifters. The design and operation of an exemplary null adaptive tracker 900 is provided in U.S. Pat. No. 4,937,582 to Mohuchy.

The implementation of the phase shifter module 200 in the disclosed configuration allows for the use of low power MMIC phase shifters. This approach results in increased efficiency derived from the reduction of RF signal power dissipation, greater mean time between failures (MTBF) and lower overall cost for polarization agile transmitter. These are very significant benefits.

The skilled artisan will readily appreciate that embodiments of the present invention may be fabricated using technologies which include those in which all components described above can be in analog or in digital chip form and which can be integrated in compact modules. For example, due to reduced RF power dissipation in phase shifter module 200, one can utilize GaAs MMIC such as coplanar GaAs waveguides. This provides a means for obtaining the advantage of small size and reduced manufacturing costs from these technologies in an ECM system. According to an embodiment of the present invention, magnitude reduction in the range of about 10:1 compared to traditional design can be achieved. In addition, the aspect of the present invention which makes it possible to utilize the solid state technology also makes it practical to utilize these technologies to provide phased array applications which were hitherto prohibitively expensive.

The embodiment of the present invention as described in FIG. 1 and explained above creates a complex module (also referred to as a "mini-jammer") that has the capability to adaptively track the polarization and direction of a threat radar signal using the concept of "measure and match," and to set and control the polarization and phase of its own output signal. In a typical ECM system a number of such modules may be implemented with an array of antennas, where each module is coupled to an antenna in order to receive and to radiate its own output signal.

Figure 2:
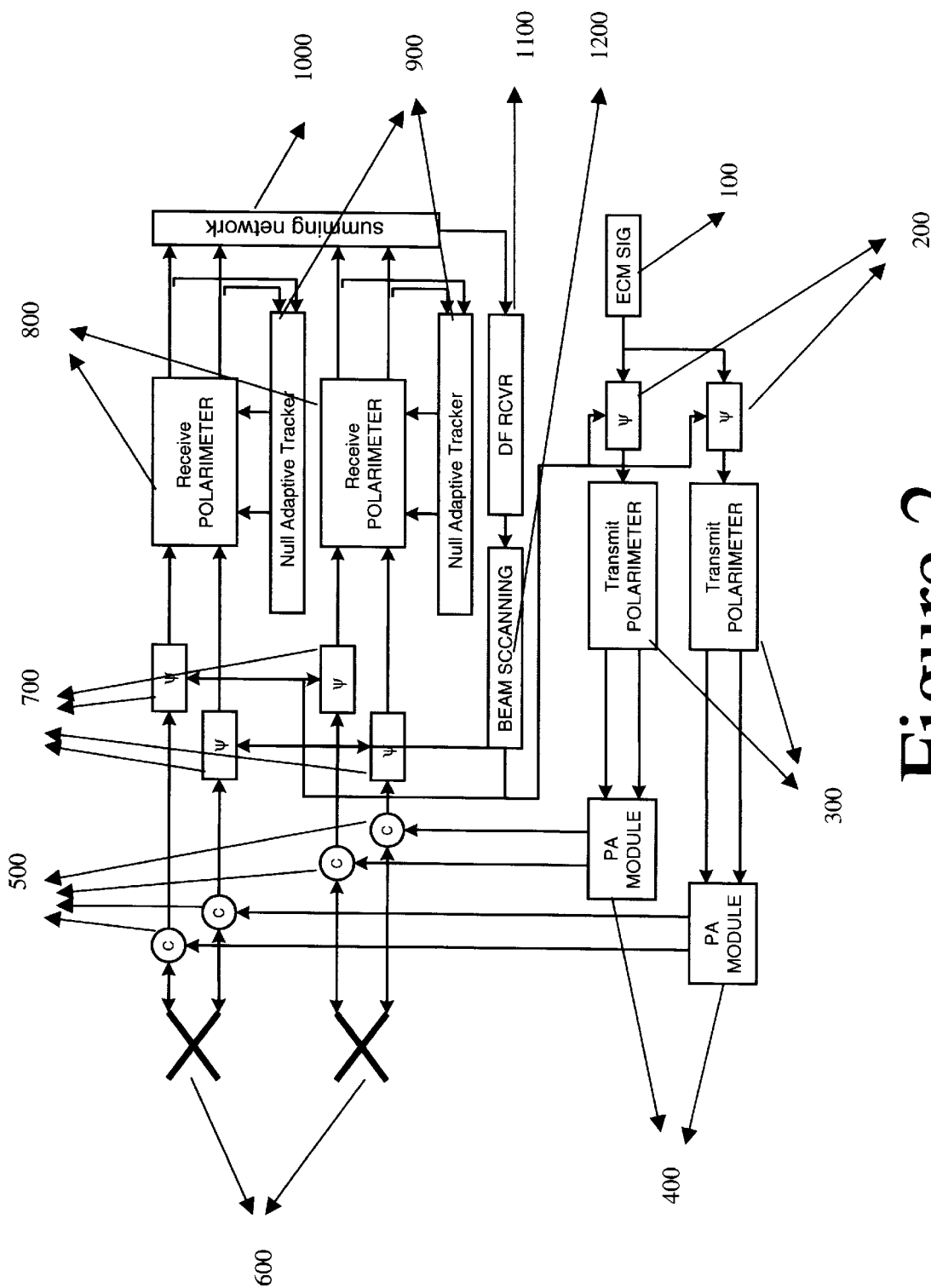
FIG. 2 is a block diagram of an EW subsystem containing multiple polarization agile transmitter modules according to an embodiment of the invention.

FIG. 2 shows an embodiment of two modules of the present invention connected with two antennas. In practice, such a system can be made up of a number of modules, such as for n=2, 3 and so on. For purposes of illustration, an ECM system with two modules is shown in FIG. 2. Each module receives an ECM signal input from the source 100. The ECM signal is inputted into beam steering phase shifter modules 200. The function of the beam steering phase shifter modules 200 is as described above in FIG. 1. The output signals from each of the beam steering phase shifter modules 200 are input into the transmit polarimeters 300, which function as described in FIG. 1 above. The output signals from the transmit polarimeters 300 are input into the power amplifier modules 400. The amplified output from the power amplifier modules 400 are input into the circulators 500. The circulators 500 performs the function of routing the signals between the power amplifier modules 400, the antenna modules 600, and the direction finding phase shifter modules 700 as explained in FIG. 1. The circulator modules 500 are connected to the DF phase shifter modules 700 using switches SW1 and SW3 as described in FIG. 1 (for simplicity, the switches SW1, SW2, SW3 and SW4 straddling the DF phase shifters of each module are not shown in the FIG. 2). The DF phase shifter modules 700 compare the phase of the transmitted signal with the phase of the incoming signal as described in FIG. 1. The outputs from the DF phase shifter modules 700 are inputted into the receive polarimeters 800. The receive polarimeters 800 analyze the polarization of the incoming signals to generate control signals as explained in FIG. 1. The receive polarimeters 800 are connected to the null adaptive trackers 900. The design and operation of the null adaptive trackers 900 is as described in FIG. 1.

In an embodiment of the present invention, the output signals from the receive polarimeters 800 are inputted into a summing network module 1000. The summing network module 1000 sums the signal received from each of the individual receive polarimeters 800. Since the signal received by each of the antenna modules 600 is part of a vector, the summing of signals received from each of the antenna modules 600 recreates the complete waveform incident upon the array of antenna modules 600. The design and implementation of such summing network 1000 is well known to those of ordinary skill in the art.

In an embodiment of the present invention, the signal output from the summing network 1000 is inputted into the DF receiver module 1100. Generally, DF receiver module 1100 includes a central processing unit (CPU) and other input-output modules to allow for the automatic monitoring and processing of directional information regarding received signals. The implementation of such a DF receiver module 1100 is well within the skill of the ordinary artisan. In an embodiment of the present invention, the output from the DF receiver module 1100 is inputted into the beam scanning module 1200. Beam scanning module 1200 allows the display of the output signal from the DF receiver module 1100 on a cathode ray tube (CRT) or other kind of monitor. This allows manual monitoring of the directional information regarding the received signal. The implementation of this beam scanning capability is well known to those of ordinary skill in the art.

As it should be clear, further embodiments of the present invention may be made without departing from its teachings and all such embodiments are considered to be within the spirit of the present invention. For example, although preferred embodiments of the present invention comprises MMIC phase shifters, it should be clear to those of ordinary skill in the art that embodiments of the present invention may be comprised of FET phase shifters as well. Also, although the invention has been described in embodiments used principally in military applications, it should be understood that the invention may be applied in non-military commercial and civilian applications. Therefore, it is intended that all matter contained in above description or shown in the accompanying drawings shall be interpreted as exemplary and not limiting, and it is contemplated that the appended claims will cover any other such embodiments or modifications as fall within the true scope of the invention.

What is claimed is:

1. A polarization agile transmitter comprising:
   a beam steering phase shifter module to enter a phase shift into an RF signal;
   a transmit polarimeter for receiving an output of the beam steering phase shifter module to control the polarization of the RF signal;
   a power amplifier module for receiving an output of the transmit polarimeter;
   an antenna module for receiving an output of the power amplifier module;
   a direction finding (DF) phase shifter module for receiving signals representative of the output of the power amplifier module and an output of the antenna module;
   a receive polarimeter for receiving an output of the direction finding phase shifter module; and
   a null adaptive tracker for receiving an output of the receive polarimeter.

2. The system of claim 1, wherein the RF signal input into the beam steering phase shifter module is an electronic counter-measure (ECM) signal.

3. The system of claim 1, wherein the beam steering phase shifter module comprises MMIC GaAs type beam steering phase shifters.

4. The system of claim 1, wherein the direction finding phase shifter module comprises MMIC GaAs type direction finding phase shifters.

5. The system of claim 1, wherein the output of the power amplifier module is coupled to the antenna module using a circulator.

6. The system of claim 5, wherein the signal received by the antenna module is coupled to the direction finding phase shifter module using the circulator.

7. The system of claim 6, wherein the output of the power amplifier module is coupled to the direction finding phase shifter module using the circulator.

8. The system of claim 7, wherein a first pair of switches are used to connect the circulator to the direction finding phase shifter module, and a second pair of switches are used to connect the direction finding phase shifter module to the receive polarimeter.

9. The system of claim 8, wherein the first pair of switches and the second pair of switches operate in a transmit mode such that a first part of the signal output from the power amplifier module is inputted into the direction finding phase shifter module and a second part of the signal output from the power amplifier module is bypassed from the first pair of switches to the second pair of switches.

10. The system of claim 9, wherein the direction finding phase shifter module measures the difference in the phase of a signal received by the antenna module and the phase of a signal output from the power amplifier module.

11. The system of claim 10, wherein the phase shift entered by the beam steering phase shifter module is adjusted based upon the measured difference.

12. The system of claim 11, wherein the receive polarimeter measures the polarization parameters of the signal received by the antenna module.

13. The system of claim 12, wherein the transmit polarimeter adjusts the polarization of the signal transmitted by the antenna module based on the measured polarization parameters.

14. The system of claim 13, wherein the null adaptive tracker analyzes the signal received from the receive polarimeter using a null adaptive algorithm to generate a series of control signals.

15. The system of claim 14, wherein the series of control signals generated by the null adaptive tracker are used to control the transmit polarimeter and the beam steering phase shifter module.

16. A system comprising a plurality of polarization agile transmitters with each polarization agile transmitter comprising:
   a beam steering phase shifter module for entering a phase shift into an RF signal input;
   a transmit polarimeter for receiving an output of the beam steering phase shifter to control the polarization of the RF signal;
   a power amplifier module for receiving an output of the transmit polarimeter;
   an antenna module for receiving an output of the power amplifier module to transmit the RF signal and to receive the RF signal;
   a direction finding (DF) phase shifter module receiving signals representative of the output of the power amplifier module and an output of the antenna module;
   a receive polarimeter receiving an output of the direction finding phase shifter module; and
   a null adaptive tracker receiving an output of the receive polarimeter.

17. The system of claim 16, further comprising a summing network coupled to the output of the receive polarimeter of each of the polarization agile transmitters.

18. The system of claim 17, further comprising a direction finding receiver connected to the output of the summing network.

19. The system of claim 18, further comprising a beam scanning module connected to the output of the direction finding receiver.

20. The system of claim 19, wherein the system comprising a plurality of polarization agile transmitters is located on an airborne vehicle.

21. A polarization agile transmitter comprising:
   means for entering a phase shift into a first RF signal;
   means for controlling the polarization of the first RF signal;
   means for amplifying the first RF signal;
   means for transmitting the first RF signal and for receiving a second RF signal;
   means for measuring the difference in phase between the first RF signal and the second RF signal;
   means for measuring the polarization of the second RF signal; and means for generating control signals using a null adaptive algorithm.

22. The system of claim 21, wherein the means for entering a phase shift into the first RF signal enters the phase shift before the first RF signal is amplified by the means for amplifying.

23. The system of claim 21, wherein the means for generating the series of control signals using a null adaptive algorithm outputs first control signals to the means for entering the phase shift into the first RF signal.

24. The system of claim 21, wherein the means for measuring the polarization of the second RF signal outputs a second control signals into the means for controlling the polarization of the first RF signal.

25. The system of claim 21, further comprising:

means for bypassing a large portion of the first RF signal around the means for measuring the difference in phase between the first RF signal and the second RF signal.

26. A method of generating a signal, comprising:

measuring the difference in phase between a transmitted RF signal and a received RF signal;

measuring the polarization of the received RF signal;

generating a first control signal to control the phase of the transmitted RF signal based on the measured difference;

generating a second control signal to control the polarization of the transmitted RF signal based on the measured polarization; and outputting an adjusted transmitted RF signal in accordance with the first control signal and the second control signal, wherein the adjusted transmitted RF signal has been phase-shifted to achieve a desired direction prior to amplification.

* * * * *